| United States Patent [19] | [11] Patent Number: 4,617,057 |
| Plueddemann | [45] Date of Patent: Oct. 14, 1986 |

[54] OIL AND WATER REPELLENT COATING COMPOSITIONS

[75] Inventor: Edwin P. Plueddemann, Midland, Mich.

[73] Assignee: Dow Corning Corporation, Midland, Mich.

[21] Appl. No.: 741,642

[22] Filed: Jun. 4, 1985

[51] Int. Cl.$^4$ ............................................... C09K 3/18
[52] U.S. Cl. ...................................................... 106/2
[58] Field of Search .............................. 106/2; 8/115.54

[56] References Cited

U.S. PATENT DOCUMENTS

| 3,317,629 | 5/1967 | Quaal | 260/827 |
| 3,681,266 | 8/1972 | Domba | 260/25 |
| 4,070,152 | 1/1978 | Pentz | 8/115.6 |
| 4,410,563 | 10/1983 | Richter et al. | 427/108 |

FOREIGN PATENT DOCUMENTS

| 142958 | 8/1983 | Japan | 3/18 |
| 147483 | 9/1983 | Japan | 3/18 |

OTHER PUBLICATIONS

N. L. Jarvis et al. in *Contact Angle, Wettability and Adhesion*, pp. 317–331, American Chemical Society, Washington, D.C. (1964).

*Primary Examiner*—Amelia B. Yarbrough
*Attorney, Agent, or Firm*—James E. Bittell

[57] ABSTRACT

An oil and water repellent coating composition is disclosed. The composition comprises a blend of an aminoorganosilane, a perfluorinated organic compound and a resin selected from the group consisting of colloidal inorganic-based siloxane resin, poly (dialkylsiloxane)-monoorgano substituted silsesquioxane block copolymer, acrylic polymer and copolymer, ethylene-vinyl acetate latex and styrene-butadiene latex. The silane and perfluorinated organic, combined, constitute from 0.1% to 10% by weight of the total resin solids in a solution or suspension of the blend. A method of coating a smooth substrate or treating a fabric to render the respective surface oleophobic and hydrophobic is further disclosed.

15 Claims, No Drawings

OIL AND WATER REPELLENT COATING COMPOSITIONS

This invention relates to the field of protective coatings. More specifically, this invention relates to hydrophobic and oleophobic coating compositions which impart water and oil repellent properties to substrates coated therewith. These substrates, in turn, may comprise hard, smooth forms such as metal, glass or plastic as well as fabrics of various types.

BACKGROUND OF THE INVENTION

Many industrial applications of materials require the surfaces of these products to possess hydrophobic and oleophobic character for both aesthetic as well as practical reasons. Coated glass cloth, employed in pre-fabricated air-supported structures such as sports stadia, for example, should have an oil repellent surface so as to prevent unsightly dirt accumulation. High voltage electrical insulators, likewise, must be hydrophobic and "self-cleaning" in contaminated environments such that surface dirt and moisture, and therefore undesirable arc tracking, are kept to a minimum. Furthermore, many coatings, such as those applied to optics, mirrors, windshields, solar collectors, and greenhouses, must retain clarity to be efficient light transmitters, and therefore also have to be "self-cleaning" (e.g., as by rainfall) relative to the uncoated surfaces. Finally, as yet another illustration of the utility of low surface energy coatings, the treatment of various fabrics for water repellency and stain resistance (i.e., oleophobicity) has become a major commercial success.

It is known in the coating arts to employ silicones to achieve hydrophobic surfaces and treated fabrics. Likewise, perfluorinated organic coatings and fabric treatments are known to confer oleophobic properties. Indeed, these two classes of materials have been effectively combined in U.S. Pat. No. 4,410,563 to coat optical glass surfaces as well as in U.S. Pat. No. 3,681,266 to treat fabrics.

Unfortunately, the perfluorinated organic compounds are quite costly and therefore not suitable for many applications in which oleophobic surfaces would otherwise prove desirable. Such disadvantage was partially overcome by U.S. Pat. No. 3,317,629, wherein fluoroalkylsiloxanes were "extended" with acrylic polymers and used to treat a variety of fabrics to obtain hydrophobic and oleophobic character. In a similar fashion, U.S. Pat. No. 4,070,152 employs a copolymer of a maleic-anhydride copolymer, a fatty acid amine and an aminoorganopolysiloxane as an extender for fluorinated "textile treating resins." It discloses improved oil and water repellency and better retention of repellency after laundering and dry cleaning relative to use of the textile treating resins alone. Still further examples of this general concept are provided by Japanese Pat. Nos. 142,958/83 and 147,483/83 which combine a perfluoroalkyl-containing silane and a silane coupling agent with water-glass and colloidal silica, respectively, for use as a water and oil repellent agent for glass surfaces.

Although such attempts to reduce the expense of fluorinated treating resins have been successful in that less of the costly ingredient is required to achieve the same extent of surface modification, complex and costly reaction schemes are sometimes required to produce the disclosed components. Furthermore, it is known from Jarvis et al. (*Contact Angle, Wettability, and Adhesion,* p. 317, American Chemical Society, Washington, D.C., 1964) that only certain combinations of fluorinated organic compounds and (extending) polymers result in low energy surfaces. Moreover, this reference teaches that a critical balance of organophilic/organophobic character (i.e., the precise solubility/insolubility balance of the fluorinated compound in the polymer) is required of the modifying fluorinated compound if the modified polymer combination is to produce a uniform, clear, high quality film, in addition to low surface energy. It is therefore recognized in the art that there is no a priori way to determine how much of, and indeed, which of the many available fluorinated organic compounds, or other low surface energy modifiers, can be successfully combined with a given polymer to produce the desired hydrophobic/oleophobic character while maintaining a uniform, high quality surface.

SUMMARY OF THE INVENTION

This invention relates to an oil and water repellent coating composition, comprising:

(a) a resin selected from the group consisting of colloidal inorganic-based siloxane resin, poly(dialkylsiloxane)-monoorgano substituted silsesquioxane block copolymer, acrylic polymer and copolymer, ethylene-vinyl acetate latex and styrene-butadiene latex, (b) an aminoorganosilane of the general formula

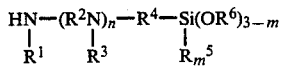

wherein $R^1$ is selected from the group consisting of hydrogen, alkyl of one to four carbon atoms or

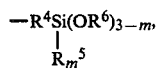

$R^2$ is an alkylene group of two to four carbon atoms, $R^3$ is hydrogen or alkyl of one to four carbon atoms, $R^4$ is an alkylene group of three to four carbon atoms, $R^5$ and $R^6$ are alkyl groups of one to four carbon atoms each, n is zero to four and m is zero or one; and (c) a perfluorinated organic compound of the general formula:

wherein $R_f$ is a straight or branched perfluoroalkyl group of four to 18 carbon atoms and Y is selected from the group consisting of —COOH, —COOR, wherein R is alkyl or alkoxyalkyl of one to six carbon atoms and wherein the combined amount of the aminoorganosilane and the perfluorinated organic compound comprises between about 0.1 and about 10 percent by weight of said resin and the mole ratio of the perfluorinated organic compound to the sum of primary and secondary amine group(s) in the aminoorganosilane is fixed between about 0.33 and about 1.0.

DETAILED DESCRIPTION OF THE INVENTION

It has been discovered that, when certain polymers or resins are modified with relatively small quantities of a perfluorinated organic compound and an aminoorganosilane, compositions result which exhibit excellent water and oil repellency when employed in bulk, as coatings or as fabric treating resins. One aspect of the invention, therefore, teaches "extending" or diluting fluorinated organic compounds with certain less expensive polymers and resins, thereby producing hydrophobic and oleophobic coating and fabric treating compositions which are less costly than these compounds alone, or in combination with, an amino-functional silane. Alternatively, the invention discloses the modification of the particular polymers or resins within its scope with the fluorinated organic compounds and amino-functional silanes so as to impart hydrophobic and oleophobic character to the surfaces of these polymers or resins, without attendant untoward effects upon other properties.

The invention may be practiced by simply blending the three components, at room temperature, either in solution or suspension, and using that solution or suspension to coat a substrate or treat a fabric. The order of blending is not critical, so that, for example, the resin and silane may be blended together and then the perfluorinated compound added, or the resin and the perfluorinated compound may be blended together and then the silane added. In the preferred, as well as most convenient, embodiment, a mixture of the perfluorinated organic compound and aminoorganosilane may be prepared (in solution or suspension) and an appropriate portion thereof used to modify the particular polymer or resin. Pre-reaction of the modifying components (i.e., formation of the perfluoroalkyl amidoalkylsilane) is not necessary for the operation of this invention.

The aminoorganosilanes employed may be selected from the group having the general formula $$HN-(R^2N)_n-R^4-Si(OR^6)_{3-m}$$
$$|\quad\quad\ |\quad\quad\ |$$
$$R^1\quad R^3\quad R^5_m$$

wherein $R^1$ is selected from the group consisting of hydrogen, alkyl of one to four carbon atoms such as methyl, ethyl, propyl, isopropyl, butyl, iso-butyl or $$-R^4Si(OR^6)_{3-m},$$
$$|$$
$$R^5_m$$

$R^2$ is an alkylene group of two to four carbon atoms such as ethylene, propylene or butylene, $R^3$ is hydrogen or alkyl of one to four carbon atoms, $R^4$ is an alkylene group of 3 to 4 carbon atoms such as trimethylene or tetramethylene, $R^5$ and $R^6$ are alkyl groups of one to four carbon atoms each, such as methyl, ethyl, propyl or butyl, n is zero to four and m is zero or one. Preferred aminoorganosilanes are:

(MeO)$_3$Si(CH$_2$)$_3$NHCH$_2$CH$_2$NH$_2$     (I)

(EtO)$_3$Si(CH$_2$)$_3$NH$_2$     (II)

and (MeO)$_3$Si(CH$_2$)$_3$NH(CH$_2$CH$_2$NH)$_4$(CH$_2$)$_3$Si(OMe)$_3$     (III)

wherein Me is CH$_3$— and Et is CH$_3$CH$_2$—.

The N-beta-aminoethyl-gamma-aminopropyltrimethoxysilane (formula I, above) is produced under the trade name Z-6020 ® by the Dow Corning Corporation, Midland, Michigan, U.S.A., and represents the most preferred aminosilane. Other suitable aminosilanes include (MeO)$_2$Si(Me)(CH$_2$)$_3$NHCH$_2$CH$_2$NH$_2$, (MeO)$_3$Si(CH$_2$)$_3$NHCH$_2$CH$_2$CH$_2$NHMe, (MeO)$_3$Si(CH$_2$)$_3$(NHCH$_2$CH$_2$)$_2$NH$_2$, (MeO)$_3$Si(CH$_2$)$_3$NH(CH$_2$)$_2$NH(CH$_2$)$_3$Si(OMe)$_3$, and (MeO)$_3$Si(CH$_2$)$_3$NH(CH$_2$CH$_2$NH)$_3$(CH$_2$)$_3$Si(OMe)$_3$.

The aminoorganosilanes are well known in the art and are typically formed by the reaction of chloroalkylalkoxysilanes with organic amines. For example, the bis structures, including formula III above, have been described in U.S. Pat. No. 4,448,694 and are formed by heating the respective amine with the appropriate chloroalkylalkoxysilane in a 1:2 molar ratio. The resultant aminoorganosilanes are generally not pure species and several side products coexist with the main component. Generally either unpurified reaction products or more purified portions of the main species can be employed for the purposes of this invention.

The perfluorinated organic compound employed, also well known in the art, may be selected from the group having the general formula $$R_fY$$

wherein $R_f$ is a straight chain or branched perfluorinated alkyl group of four to 18 carbon atoms, six to 12 carbons being preferred and seven to nine carbons being most preferred. Examples of $R_f$ would include C$_{18}$F$_{37}$—, C$_{12}$F$_{25}$—, C$_9$F$_{19}$—, C$_8$F$_{17}$—, C$_7$F$_{15}$—, C$_6$F$_{13}$— and C$_4$F$_9$—. Y is either a carboxy (—COOH) or an ester (—COOR) moiety wherein R is alkyl, alkoxyalkyl or hydroxyalkyl, of one to eight carbon atoms, methyl being preferred. Other usable R groups include ethyl, propyl, isopropyl, butyl, isobutyl, pentyl, hexyl, heptyl, octyl, 2-ethylhexyl, 2-hydroxypropyl, and 2-methoxyethyl.

The carboxy, or ester, group is capable of reacting with the aminoorganosilane component to form a perfluoroalkylamidosilane. This reaction has been shown to occur slowly in the case of the carboxy compound (R. E. Banks, *Fluorocarbons and their Derivatives*, Oldbourne Press, London, 1964). According to R. D. Chambers (*Fluorine in Organic Chemistry*, J. Wiley, London, 1973), however, the reaction with perfluoroalkyl esters is quite facile. It results in an exotherm even at room temperature and is completed by brief heating to 80° C. In any event, the reaction does not constitute a necessary pre-condition to the operability of the current invention. In fact, when the amidosilane reaction product of C$_7$F$_{15}$COOH or C$_9$F$_{19}$COOH with Z-6020 ® was formed by refluxing the reactants in xylene, it was found to be a viscous oil, insoluble in all common solvents tried and could not be used according to the current invention. Contrarily, equimolar dispersions of these fluoroalkyl acids and Z-6020 ® in water were found to be stable for about one year and could be employed in such a salt form to modify the water-based polymers or resins within the scope of the current invention. It is, of course, recognized that reactions can occur between the aminoorganosilane and the perfluoroalkyl acid, during subsequent drying and/or curing of the resins of the current invention.

As was explicitly recited in the "Background of the Invention" section, supra, and as will be readily appreciated by those skilled in the art, a critical balance of solubility/insolubility of the modifying components in the polymer or resin is required in order to impart the desired surface hydrophobicity and oleophobicity while retaining other advantageous properties of the polymer or resin. This result can only be achieved when specific fluorinated organic compound, aminoorganosilane and extending polymer or resin are combined in a particular ratio. The specific preferred compositions and ratios of modifying components was determined for the individual polymers or resins within the scope of this invention. In each case, the preferred molar ratio of perfluorinated organic compound to the total of primary and secondary amine group(s) in the aminoorganosilane was found to be 1:2, although ratios may range between 1:1 and 1:3 within the scope of the invention. Between about 0.1% and about 10% by weight, based on resin solids, of the combined amount of aminoorganosilane and perfluorinated organic compound is effective, while about 1% to 2% is preferred.

The class of materials referred to as "colloidal inorganic-based siloxane resin" comprises an acidic dispersion of colloidal silica and hydroxylated silsesquioxane in an alcohol-water medium. More specifically, these pigment-free aqueous coating compositions comprise a dispersion of colloidal silica in lower aliphatic alcohol-water solution of the partial condensate of a silanol of the formula $R^7Si(OH)_3$. $R^7$ is selected from the group consisting of alkyl radical of 1 to 3 inclusive carbon atoms, the vinyl radical, the 3,3,3-trifluoropropyl radical, the gamma-glycidoxypropyl radical and the gamma-methacryloxypropyl radical. At least 70 weight percent of the silanol is $CH_3Si(OH)_3$. The compositions contain from 10 to 50 weight percent solids, consisting essentially of 10 to 70 weight percent colloidal silica and 30 to 90 weight percent of the partial condensate. Finally, the compositions contain sufficient acid to provide a pH in the range of 3.0 to 6.0. Detailed description, and method of preparation, of these compositions may be found in U.S. Pat. No. 4,027,073 which is hereby incorporated by reference.

These resins have found great utility as clear or tinted protective coatings, particularly for plastic substrates, wherein they impart hard, abrasion-resistant surfaces to, for example, optical elements such as spectacles. Although coatings derived from these resin suspensions are somewhat hydrophobic, presumably due to the monoorganosilsesquioxane component, modification according to the current invention is desirable to achieve oleophobic surfaces as well. Such modification would enhance the coating's utility in applications where dirt pick-up, staining or smudging were of concern. Examples would include plastic windshields, appliance protective coatings, electrical insulators and cover plates for solar cell modules.

Modification of the colloidal inorganic-based siloxane resin suspensions was achieved with addition of either the preferred fluor alkyl acids or esters and aminoorganosilane. Coatings are typically cured on glass or plastic substrates for about 15 minutes at 150° C. One advantage of the present invention is that coated substrates retain the oleophobic surface characteristics even after soaking in water for extended periods. When the aminoorganosilane component is intentionally left out of the compositions, poorer retention of oleophobicity is observed. Furthermore, without the aminoorganosilane component, coatings on glass slides retract into "islands" so that uniform surface coverage is not attainable, even though the suspension, before coating, is clear. All the compositions within the scope of this invention result in uniform, cured coatings which retain the hard, abrasion resistant surface characteristics of the unmodified resins.

Poly(dialkylsiloxane)-monoorgano substituted silsesquioxane block copolymers, hereinafter referred to as "block copolymers," are room temperature curable through, e.g., alkoxy functionality. The block copolymers comprise poly(diorganosiloxane) and monoorganosilsesquioxane units. The block copolymer may be "capped" with alkoxy functionality and is generally applied from toluene or xylene solution. These block copolymers may be effectively employed for junction coating and encapsulation of components in the electronics industry. They also find utility in the coating of glass cloth for such applications as air-supported structures, greenhouses and semi-enclosed architectural tents for, e.g., shopping centers. The latter applications take advantage of the material's relatively low degree of dirt pick-up from airborne contamination; this allows a fair retention of light transmission and pleasing aesthetics after long-term outdoor exposure. Nevertheless, the soiling resistance is not equal to that of, e.g., Teflon ® (E. I. Du Pont de Nemours, Wilmington, Delaware, U.S.A.) and improvements for the above-mentioned applications, as well as others, are desirable. Detailed descriptions of the block copolymers and their method of preparation may be found in U.S. Pat. Nos. 3,639,155, 3,629,228, and 4,508,887, which are hereby incorporated by reference.

Excellent oleophobic and hydrophobic coatings, moisturecured on glass slides, are obtained by blending perfluoroalkyl acid in combination with aminoorganosilane into a block copolymer composed of 70 mole percent poly(dimethylsiloxane) and 30 mole percent phenylsilsesquioxane units and capped with methyldimethoxysiloxane end blocks. An attendant result of this modification is significant augmentation of adhesion of the coating to the glass surface. Other ratios of the blocks of the block copolymer can be employed and a range of about 40 to about 75 mole percent of the poly(diorganosiloxane) component is within the scope of this invention. The poly(diorganosiloxane) block may also include polymers of phenylmethylsiloxane, methylvinylsiloxane and diethylsiloxane. The silsesquioxane block may further comprise tolyl, xylyl, propyl, methyl, vinyl or ethyl substituted silsesquioxanes. Other siloxane endblocking (capping) units may comprise ethyldimethoxy, methyldiethoxy, methylethoxymethoxy, propyldimethoxy, butyldimethoxy and phenyldimethoxy.

Acrylic polymers are well known in the art. These are produced by polymerization of acrylic ester monomers such as methylmethacrylate, for example. Copolymers with other monomers, such as methyl acrylate, ethyl acrylate, acrylonitrile and styrene, have been reported. These polymers and copolymers may be either thermoplastic or thermosetting, depending on formulation and processing. Furthermore, these polymers and copolymers are known in the form of bulk plastic, solution and dispersion (e.g., latex).

Like the above-mentioned siloxane block copolymers, the cured films resulting from thermosettable acrylic copolymer latices are hydrophobic but not oleophobic. Oleophobic character was readily imparted according to the current invention by blending with such acrylic latices, the perfluorinated compound and aminoorganosilane. The materials were cured, typically at 80° C. for about two hours, on a plastic substrate, prior to evaluation of surface properties.

Generally, the term "thermosettable acrylics" as used herein includes an acrylic polymer or copolymer having reactive functional groups which are capable of reacting between themselves to effect a cross-linkage thereof. These materials are described, for example, in U.S. Pat. No. 4,353,965. The term, thermosettable acrylics, also includes acrylic polymers or copolymers having a reactive functional group to which there is added an appropriate cross-linking agent which reacts with the functional group to effect cross-linking. The term, thermosettable acrylics, still further includes a mixture of two or more polymers containing cross-linkable functional reactive groups. These polymers may be acrylic polymers or copolymers having reactable, cross-linkable, functional groups thereon, or at least one of the polymers may be an acrylic polymer or copolymer having a reactive functional group and the other polymer or copolymer may be one or more other types of known polymers having functional groups which are reactive with the acrylic functional group to provide the thermoset product as a result of cross-linking.

The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butyl-aminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, malemide, N-methylolacrylamide, N-(isobutoxmethyl)acrylamide, vinyl isocyanate, allyl isocyanate. Usually the other monomer which will be polymerized along with the monomer supplying the functional group is a lower ($C_1$–$C_3$) alkyl acrylic ester or mixtures thereof, e.g. methyl acrylate, ethyl acrylate, methyl methacrylate, ethyl methacrylate, or mixtures thereof, in an amount ranging between about 75 parts to about 99 parts and, more typically, between about 80 parts to about 97 parts.

Suitable thermosettable acrylic copolymer latices are the water dispersions of commerce: Rhoplex ® AC868, Rhoplex ® 604 and Acrysol ® WS-12 (Rohm and Haas Co., Philadelphia, Pennsylvania, U.S.A.). These are described as thermosetting acrylic copolymers, generally used with melamine resin cross linkers of the form

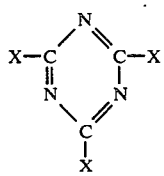

wherein X is

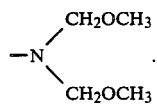

Cure of these resins is effected through functionality pendant on the acrylic copolymer, according to, e.g.,

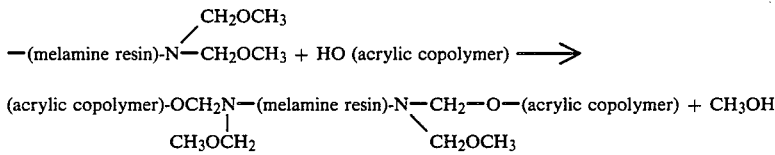

In addition to the latices discussed, solvent-based acrylic copolymers, such as Rohm and Haas Acryloid ® AT-51, were equally amenable to modification with addition of a blend of perfluorinated compound and aminoorganosilane. Cured in like fashion to the acrylic latices supra, the films from such compositions were clear and adhered well to polycarbonate and poly(methylmethacrylate) substrates.

Excellent oleophobic character was imparted to fabrics treated with certain polymer latices which were first modified with blends of perfluorinated compound and aminoorganosilane. Latices which provided oleophobic fabrics included acrylic, ethylene-vinyl acetate (EVA) and styrene-butadiene (SB) copolymers. An example of a thermoplastic acrylic polymer latex is Rhoplex ® AC-235 (Rohm and Haas, Philadelphia, Pennsylvania, U.S.A.). EVA copolymers are thermoplastic polymers, which may contain from about 5 to 50 percent by weight of vinyl acetate randomly copolymerized with ethylene under high pressure, and are well known in the art. An example of such an EVA copolymer is ELVACE ®-1875 (Reichhold Chemicals, Inc., Dover, Delaware, U.S.A.). SB copolymers, also well known in the art, are random copolymers of styrene with butadiene. An example of this latex type is DL233 (Dow Chemical Co., Midland, Michigan, U.S.A.). These modified latex compositions may be applied to any natural or synthetic fabric such as cotton, wool, polyester, nylon, Dacron, glass or various blends thereof. Fabrics are rendered relatively non-staining when treated with the above-described compositions and dried. A typical dry cycle on 65/35 polyester/cotton fabric is preferably about 30 minutes at 90° C. when the treatment consists of dipping in a 15% total solids modified latex.

Polyurethane latex (e.g., Spensol ®, an emulsified thermoplastic polyurethane manufactured by the Spencer Kellog Division of Textron, Inc., Buffalo, New York, U.S.A.) did not lend itself to modification according to the instant invention and fabric treated with this composition was only moderately hydrophobic and oleophobic. This illustrates the lack of precise balance of solubility/insolubility needed for this invention. Likewise, attempts at modification of a one-part curable rubber composition suitable for coating high voltage insulators, based on ketoxime-functional poly(dimethylsiloxane) and filled with hydrated alumina, failed to produce an oleophobic surface while maintaining a quality coating.

The coating compositions of this invention can be employed to coat solid or fabric substrates. Solid substrates may include, for example, metal, glass, ceramic or plastic items. Plastics which may be coated include polycarbonate, polystyrene, poly(methylmethacrylate) and poly(vinylchloride), for example. Metals which may be coated include steel, aluminum, brass, copper, bronze, iron and lead, for example. Representative fabrics, which may be treated with the compositions of this invention, inlcude cotton, wool, nylon, rayon, cellulose acetate, dacron and glass, for example.

The following examples are illustrative only and should not be construed as limiting the invention which is set forth in the appended claims. All compositions are in weight percent based on solids content, except where noted.

EXAMPLE 1

Perfluoroalkyl esters were prepared from the corresponding carboxylic acids and the indicated co-reactants by heating at reflux in a stirred flask, equipped with a water trap, for the indicated time.

A. 5.41 g of $C_9F_{19}COOH$, 20.0 g of $CH_3CH(OH)CH_2OCH_3$, and 25.0 g toluene were mixed in a flask. The reactants were refluxed for 1 hour and 0.2 ml water was recovered in the trap to provide a clear solution which contained 0.01 mole of the ester in 50 g of solution.

B. 41.4 g of $C_7F_{15}COOH$, 20.0 g of isoproponol, 40.0 g of toluene and 0.1 g of toluenesulfonic acid were mixed in a flask. The reactants were refluxed for 4 hours and 2 ml of an aqueous layer was recovered in the trap. The residual clear solution contained 0.1 mole of ester in 100 g solution.

C. 41.4 g of $C_7F_{15}COOH$, 20.0 g of trimethylorthoformate and 40.0 g of methanol were mixed in a flask. The reactants were refluxed for 4 hours. Analysis by gas-liquid chromatography indicated about 83% methyl ester formation and 17% residual acid.

EXAMPLE 2

The perfluorinated ester from Example 1A, was blended in equimolar amounts with N-beta-aminoethyl-gamma-aminopropyltrimethoxysilane (Dow Corning Z-6020 ®) (i.e., 1:2 mole ratio of perfluorinated ester to total primary and secondary amine groups in the silane) in methanol solution (50%). This solution was then added in varying amounts, as indicated in the first column of Table I, to a colloidal inorganic-based siloxane resin suspension, the preparation and full description of which is essentially disclosed in Example 1 of U.S. Pat. No. 4,027,073.

The modified resin mixtures were employed to knife-coat thin films onto substrates of glass, polymethylmethacrylate and polycarbonate. The coatings were cured in an air oven at 150° C. for 15 minutes. The cured films were optically clear and retained the desirable abrasion resistance of unmodified resin films, i.e., they could not be scratched by No. 0000 steel wool. In order to assess the hydrophobic/oleophobic character of the coatings, a semi-quantitative test was employed whereby uniform drops of water, or liquid hydrocarbon of low molecular weight, were applied to the cured surfaces and the drop diameter measured. This diameter is inversely proportional to contact angle of the liquid-substrate interface and therefore an inverse indication of wettability; i.e., a small diameter drop results when the surface is not wetted by the liquid applied, while a large drop, or liquid "spreading," is observed when the liquid wets the surface. Table I summarizes the observations using water to test for hydrophobicity and a series of three hydrocarbon fluids, $C_7$ through $C_{16}$, to determine oleophobicity of the test surface. The effect of as little as 0.4% of the perfluorinated ester-aminosilane blend was detectable but modification with about 2% of the blend was preferred, while increasing the blend content beyond 2% offered no significant advantage in this test. For comparison purposes, 2% of the amide reaction product of lauric acid with N-beta-aminoethyl-gamma-aminopropyltrimethoxysilane was mixed with the resin suspension, tested on glass and found not to offer significant improvement with respect to hydrophobicity/oleophobicity relative to an unmodified resin coating.

TABLE I

Modification of a colloidal inorganic-based siloxane resin with perfluoroalkylester/aminoorganosilane blend. (Liquid drop diameter given in millimeters)

| Percent modifier blend (based on solids) | Glass | | | | Poly(methylmethacrylate) | | | | Polycarbonate | | | |
| --- | --- | --- | --- | --- | --- | --- | --- | --- | --- | --- | --- | --- |
| | $H_2O$ | $C_{16}$ | $C_{10}$ | $C_7$ | $H_2O$ | $C_{16}$ | $C_{10}$ | $C_7$ | $H_2O$ | $C_{16}$ | $C_{10}$ | $C_7$ |
| 8 | 6 | 5 | 5 | 5 | 5 | 6 | 5 | 5 | | | | |
| 4 | 6 | 5 | 5 | 5 | | | | | | | | |
| 2 | 5 | 4 | 5 | 4 | 5 | 5 | 5 | 4 | 5 | 5 | 5 | 5 |
| 0.4 | 4 | 8 | 9 | 10 | 5 | | | | 5 | 7 | 8 | S |
| none | 5 | 8 | 10 | S | 5 | S | S | S | 5 | 7 | 10 | S |
| 2 percent lauarmide of N—beta-aminoethyl-gamma-aminopropyltrimethoxy-silane | 5 | 8 | S | S | | | | | | | | |

S = the liquid spread
$C_{16}$ = hexadecane
$C_{10}$ = decane
$C_7$ = heptane

EXAMPLE 3

The perfluorinated acids $C_7F_{15}COOH$ and $C_9F_{19}COOH$, as well as the respective methyl esters, were blended with Dow Corning Z-6020®, N-beta-aminoethyl-gamma-aminopropyltrimethoxysilane in equimolar ratios, as in Example 2. These blends were added to the colloidal inorganic-based siloxane resin suspension of Example 2 at levels of 1 and 2% based on solids. A coating of each composition was applied to glass, cured and tested, all in accordance with Example 2.

Table II shows that, at these levels, the perfluoroalkyl acids and esters were essentially equivalent in imparting hydrophobicity and oleophobicity to the modified resin surface, with the composition containing 2% modifying blend being slightly preferred. The last three columns represent measurements performed after immersion of the coatings in room temperature water for a period of 1 hour and are an indication of relative permanence of the surface modifications. Resin modified with only $C_9F_{19}COOH$ (i.e., no Z-6020®) was more easily leached by water and resulted in reduced permanence versus modification with the corresponding blend (i.e., with Z-6020®). Moreover, even though the fluoroalkyl acid-modified resin suspensions retained clarity, films of these compositions on glass retracted into "islands" which prevented uniform coverage. This indicated that, without the aminoorganosilane component, the fluoroalkyl acids were too incompatible with the colloidal inorganic-based siloxane resin. As in Example 1, an amide was formed from the amino-silane and lauric acid; this composition resulted in a hydrophobic, but not oleophobic, coating when the resin was modified at a 2% level.

TABLE II

Modification of a colloidal inorganic-based siloxane resin with perfluoroalkylester/ amino-silane and perfluoroalkyl acid/aminoorganosilane blends. (Liquid drop diameter given in millimeters).

| Perfluoro Compound with amino-silane | Percent Added | Initial Surface | | | | After soaking 1 hr. in H$_2$O | | |
|---|---|---|---|---|---|---|---|---|
| | | H$_2$O | Decane | Heptane | iPA | H$_2$O | Heptane | iPA |
| C$_7$ acid | 2 | 5 | 5 | 5 | 6 | 5 | 8 | 8 |
| C$_7$ ester | 2 | 5 | 5 | 5 | 6 | 5 | 8 | 9 |
| C$_9$ acid | 2 | 4 | 5 | 5 | 5 | 5 | 10 | 7 |
| C$_9$ ester | 2 | 4 | 5 | 6 | 6 | 5 | 12 | 10 |
| C$_7$ acid only (no silane) | 1 | 7 | 6 | 8 | 10 | 6 | S | 12 |
| C$_9$ acid only (no silane) | 1 | 5 | 6 | 8 | 7 | 6 | S | 12 |
| C$_7$ acid (with amino-silane) | 1 | 6 | 6 | 7 | 7 | 5 | S | 11 |
| C$_7$ ester (with amino-silane) | 1 | 6 | 6 | 7 | 8 | 5 | S | 11 |
| C$_9$ acid (with amino-silane) | 1 | 5 | 6 | 6 | 6 | 6 | 10 | 8 |
| C$_9$ ester (with amino-silane) | 1 | 5 | 7 | 10 | 7 | 5 | S | 9 |

S = spread
i-Pa = Isopropanol

TABLE III

Modification of a colloidal inorganic-based siloxane resin with $C_7F_{15}COOH$ and N—beta-aminoethyl-gamma-aminopropyltrimethoxysilane: Effect of order of mixing. (Liquid drop diameter given in millimeters).

| Order of addition | H$_2$O | Hexadecane | Decane | Heptane | i-PA |
|---|---|---|---|---|---|
| Silane added to resin, then C$_7$F$_{15}$COOH | 5 | 5 | 7 | 8 | 12 |
| C$_7$F$_{15}$COOH added to resin, then silane | 5 | 5 | 7 | 6 | 12 |
| C$_7$F$_{15}$COOH added to silane, then resin | 6 | 4 | 5 | 6 | 10 | i-PA = Isopropanol

EXAMPLE 5

Toluene solutions (70% solids) of a room temperature vulcanizable block copolymer of (70 mole percent polydimethylsiloxane with about 35 siloxy units per block, and 30 mole percent phenyl silsesquioxane, endblocked with methyldimethoxysiloxy units) were prepared according to methods essentially disclosed in Example 1 of U.S. Pat. No. 4,508,887. The catalyst used to couple poly(dimethylsiloxane) blocks to phenyl silsequioxane blocks was changed to a combination of 0.0026% iron octoate and 0.018% concentrated hydrochloric acid, both weight percents based on total resin solids. These block copolymer solutions were modified with 1% of

EXAMPLE 4

The colloidal inorganic-based siloxane resin employed in Examples 2 and 3 was mixed with $C_7F_{15}COOH$ and N-beta-aminoethyl-gamma-aminopropyltrimethoxysilane, the latter two components being maintained at a 1:1 molar ratio, as in Example 3. Order of mixing the ingredients was varied such that the total modification level, based on resin solids, was maintained at 2%. The modified resin blends were coated onto polycarbonate sheets and cured at 100° C. for 30 minutes each. Table III summarizes drop diameter results for these blends, using the same formalism as in the previous two examples. It can be seen that results are relatively insensitive to the order of mixing resin, perfluorinated acid and N-beta-aminoethyl-gamma-aminopropyltriemthoxysilane, although adding the blend of the latter two components to the resin is preferred.

the fluoroalkyl acid (or ester)/aminoorganosilane blends described in Example 3. The solutions were coated onto glass microscope slides and allowed to moisture cure in ambient air.

Table IV compares water and hydrocarbon drop diameters, as described in Example 2, of an unmodified control block copolymer surface with three modified films. While the control exhibited only a hydrophobic surface, all modified films were hydrophobic and oleophobic. Furthermore, a significant improvement in adhesion of the coatings to the glass slide was observed with the modified compositions.

TABLE IV

Modification of a poly(dimethylsiloxane)-phenylsilsesquioxane block copolymer with perfluoroalkyl acid/aminoorganosilane and perfluoroalkyl ester/aminoorganosilane blends. (Liquid drop diameters given in millimeters).

| % - Blend | H$_2$O | C$_{16}$ | C$_{10}$ | C$_7$ | i-PA | Adhesion to Glass |
|---|---|---|---|---|---|---|
| None | 5 | 10 | 10 | S | S | v. poor |
| 1% silane/ | 6 | 4 | 4 | 5 | 6 | good |

TABLE IV-continued

Modification of a poly(dimethylsiloxane)-phenyl-silsesquioxane block copolymer with perfluoroalkyl acid/aminoorganosilane and perfluoroalkyl ester/aminoorganosilane blends. (Liquid drop diameters given in millimeters).

| % - Blend | $H_2O$ | $C_{16}$ | $C_{10}$ | $C_7$ | i-PA | Adhesion to Glass |
|---|---|---|---|---|---|---|
| $C_9F_{19}COOH$ 1% silane/ $C_7F_{15}COOH$ | 5 | 5 | 6 | 6 | 8 | excellent |
| 1% silane/ $C_7F_{15}COOCH_3$ | 4 | 6 | 6 | 7 | 8 | good |

S = spread
$C_{16}$ = hexadecane
$C_{10}$ = decane
$C_7$ = heptane
i-PA = isopropanol

EXAMPLE 6

This example is presented for comparison purposes only and is not within the scope of the instant invention.

A one part, curable, soft, silicone rubber coating, suitable for application to high voltage insulators to prevent arc tracking thereof, consisting of a naphthol spirits dispersion (78% solids) of ketoxime-functional polydimethylsiloxane fluid of a viscosity of about 10,000 cp, about 40% hydrated alumina filler and an organotin curing catalyst (0.25% dibutyl tin di-2-ethylhexoate), was modified with equimolar blends of N-beta-aminoethyl-gamma-aminopropyltrimethoxysilane and $C_9F_{19}COOH$, as in Example 3.

When applied to glass slides, the silicone rubber coating containing 1% of the blend severely retracted, producing a "pock marked" surface of incompatible droplets. Addition of only 0.05% of the blend did result in a uniform cured film but no change in surface hydrophobicity or oleophobicity was detected versus an unmodified control coating. These results are summarized in Table V.

TABLE V

Modification of a soft silicone rubber coating composition with a $C_9F_{19}COOH$/Aminoorganosilane blend. (Liquid drop diameters given in millimeters).

| | Drop Diameter | | | |
|---|---|---|---|---|
| % Blend | $H_2O$ | $C_{16}H_{34}$ | $C_{10}H_{22}$ | $C_7H_{14}$ |
| none | 5 | 9 | 10 | 12 |
| 0.05 | 5 | 9 | 9 | 12 |
| 1.0* | 5 | 7 | 6 | 9 |

*spotty; poor surface quality

EXAMPLE 7

A silane-modified crosslinker was prepared by cold-blending 5 parts gamma-glycidoxypropyltrimethoxysilane (Dow Corning Z-6040 ®) with 95 parts of a methylol-functional melamine resin (CYMEL ® 370, American Cyanamid, Wayne, New Jersey, U.S.A.) according to U.S. Pat. No. 4,231,910. Thirty parts of this blend was mixed with 100 parts each, based on solids, of three commercially available (Rohm and Haas Co.; Philadelphia, Pennsylvania, U.S.A) water dispersions of thermosetting acrylic resins which were prediluted to 10% solids. The resins employed in this example are described as follows. Rhoplex ® AC-868 is a thermosetting acrylic emulsion, without crosslinker, having a total solids content 50%, a pH (as packed) of 8.8, a dry density of 0.1099 gals/lb and is recommended for use with water-borne nitrogen (melamine and urea) resins.

Rhoplex ® AC-604 is a thermosetting acrylic emulsion, with self-contained crosslinker, a total solids content of 46%, a pH (as packed) of 10.0 and a dry density of 0.101 gals/lb.

Acrysol ® WS-12 is a colloidal dispersion with a total solids content of 30%, a pH (as packed) of 8.2, a dry density of 0.103 gals/lb and is recommended for air dry (as supplied) or baking finishes (crosslinked with melamine resin).

To each of the above mixtures of acrylic resins and silane modified crosslinker, was added 2% (based on solids) of an equimolar blend (as in Example 3) of N-beta-aminoethyl-gamma-aminopropyltrimethoxysilane (Z-6020 ®) and $C_9F_{19}COOH$ in the form of a 10% solution in methanol. These dispersions were coated onto polycarbonate sheets, cured for 2 hours at 80° C. and tested for wettability as in the previous examples. All films were optically clear.

The liquid drop diameter measurements, Table VI, indicate hydrophobic surfaces in these cases, but the degree of oleophobicity obtained was somewhat less than with the colloidal inorganic-based siloxane resin of Example 2, when similarly modified. This offers further evidence of the critical relationship between blend composition, modification level and ultimate surface character.

TABLE VI

Wettability of Modified Acrylic Polymers on Polycarbonate Substrate.

| | | Diameter of drops (mm) | | | | |
|---|---|---|---|---|---|---|
| Acrylic Polymer | Modifier | $H_2O$ | hexadecane | decane | heptane | 2-B Ethanol |
| Siloxane resin of Ex. 2 | silane/ $C_9F_{19}COOH$ | 6 | 5 | 5 | 5 | — |
| Rhoplex AC 868 | Z-6020 ® + $C_9F_{19}COOH$ | 7 | 6 | 8 | 9 | S |
| Rhoplex AC 604 | Z-6020 ® + $C_9F_{19}COOH$ | 5 | 5 | 7 | 7 | S |
| Acrysol WS-12 | Z-6020 ® + $C_9F_{19}COOH$ | 5 | 7 | 8 | 10 | S |

S = spread

EXAMPLE 8

Acroloid ®AT-51 (Rohm and Haas) is described as a solvent-based thermosetting acrylic resin with a total solids content of 50% in a 78% xylene/22% butanol solution having a viscosity in the range of 1,070-2,265 cps. The resin has hydroxyl functionality and is designed to cure via a self-contained melamine crosslinker. This resin was diluted to 10% solids with $CH_3CH(OH)CH_2OCH_3$ (Dowanol ® PM, Dow Chemical Co., Midland, Michigan, U.S.A.) and 1% of an equimolar blend of N-beta-aminoethyl-gamma-aminopropyltrimethoxysilane and $C_9F_{19}COOH$ was added thereto, as in Example 3. This mixture was coated onto polycarbonate and polymethylmethacrylate sheets, dried and cured for 2 hours at 80° C.; the resulting films were optically clear and had good adhesion to the polycarbonate substrate.

The composition containing both fluoroalkyl acid and aminoorganosilane provided excellent hydrophobic/oleophobic surfaces (Table VII). A similar composition, containing only the fluoroalkyl acid, was marginally hydrophobic (Table VII), and not olephobic, when a coating cured on polycarbonate sheet was tested.

TABLE VII

Wettability of Modified Acrylic Films

| Adduct to AT-51 1% based on solids | Film on Polycarbonate Substrate Diameter of drops (mm) | | | |
|---|---|---|---|---|
| | $H_2O$ | Hexa-decane | hep-tane | 2-B Ethanol |
| Silane/$C_9F_{19}$COOH | 4.5 | 6 | 6 | 8 |
| $C_9F_{19}$COOH, no silane | 7 | 12 | S | S | — |
| | Film on Poly(methyl-methacrylate) substrate | | | |
| Silane/$C_9F_{19}$COOH | 6 | 6 | 7 | 7 | 9 |

S = spread

EXAMPLE 9

An equimolar blend of $C_7F_{15}$COOH and N-beta-aminoethyl-gamma aminopropyltrimethoxysilane (as in Example 3) was added to four commercial thermoplastic organic polymer latices (6% level each, based on latex solids). The resulting mixtures were diluted with water to a total solids content of 15% and used to impregnate (by dipping) 65/35 polyester/cotton fabric samples which were subsequently dried for 30 minutes at 90° C. in an air oven.

The polymer latices employed in this example are described above and additionally as follows:

Spensol ® is a thermoplastic polyurethane emulsion supplied by spencer Kellog Division of Textron, Inc., Buffalo, New York, U.S.A.

Acrylic latex Rhoplex ® AC-235 is a thermoplastic acrylic copolymer emulsion produced by Rohm and Haas, Philadelphia, Pennsylvania, U.S.A.

ELVACE ®-1875 is an ethylene-vinyl acetate (EVA) copolymer latex produced by Reichhold Chemicals, Inc., Dover, Delaware, U.S.A. It is described as a "high" ethylene content EVA copolymer water-based emulsion having a solids content of 55%, pH of 4.5 and a density of 8.9 pounds/gallon.

Styrene-butadiene (SB) DL233, manufactured by the Dow Chemical Co., Midland, Michigan, U.S.A., is a water-based carboxylated styrene-butadiene copolymer emulsion having a solids content of 50%, pH of 6.0, particle size of 1600 to 1900 Å and viscosity of less than 300 cps.

The fabrics treated with the above-described latices were evaluated with respect to water and alcohol (2-B ethanol) repellency on a qualitative basis. This involved observation of relative absorption of each liquid by the treated fabric samples. Additionally, oil repellency was determined according to the American Association of Textile Chemists and Colorists (AATCC) Standard Test Method 118-1972. Briefly, this procedure ranks the oil repellency of textiles by determining which of a series of hydrocarbon oils of increasing surface tension does not wet the fabric, a rating of 8 indicating the greatest repellency. The test is completely described in the Manual of AATCC, Volume 48 Edition 1972. Results of the water and oil repellency tests, summarized in Table VIII, indicate excellent oleophobicity was imparted to the fabric when the modified acrylic, ethylene-vinyl acetate and styrene-butadiene latices were used as treatments. Modified polyurethane latex did not result in improved water and oil repellency and is only included in this example for comparison purposes.

TABLE VIII

Water, Alcohol and Oil Repellency of Polyester/Cotton Fabrics Treated with Modified Polymer Latices.

| Latex | Water Repellency | Oil Repellency Rating | 2-B Ethanol Resistance |
|---|---|---|---|
| Polyurethane (Spensol) | Fair | 2 | No |
| Acrylic (AC-235) | Poor | 8 | No |
| EVA (Elvace-1875) | Good | 8 | No |
| SBR (DL-233) | Good | 7 | Yes |

EXAMPLE 10

Two perfluoroalkyl acids were blended with gamma-aminopropyl triethoxysilane and bis-trimethoxysilyl-propyl-tetraethylenepentamine, the latter made according to Example 2, U.S. Pat. No. 4,448,694. Each blend was diluted with water to a total solids content of 2%. This dispersion was employed to treat 65 cotton/35 polyester fabric by dipping. Treated samples were dried for 5 minutes at 80° C. and the water, alcohol and oil repellency ratings were determined according to the methods of Example 9. Good to excellent oil and water repellency of the treated fabrics was obtained. (Table IX).

If the blends of Table IX are mixed with the acrylic, ethylene-vinylacetate and styrene-butadiene rubber latices of Example 9 at about 6% based on latex solids, and used to treat fabrics as described in Example 8, similar improvements in oil repellency would ensue.

TABLE IX

Water, Alcohol and Oil Repellency of Cotton/Polyester Fabrics treated with Perfluoroalkyl acid/Aminoorganosilane Blends.

| Aminofunctional silane (1 mole) | Perfluoro-alkyl Acid | Acid* Amt. | Water Repellency | Oil Repellency Rating | 2-B Ethanol Repellency |
|---|---|---|---|---|---|
| prehydrolyzed $H_2N(CH_2)_3Si(OEt)_3$ | $C_7F_{15}$COOH | 1 mole | yes | 7 | — |
| Silane A | $C_9F_{19}$COOH | 2 mols | yes | 8 | yes |
| Silane B | $C_7F_{15}$COOH | 2 mols | yes | 7 | no |

Silane A is a bis-trimethoxysilylpropyl substituted tetraethylene pentamine.
*Molar amount of perfluoroalkyl acid component per one mole of aminosilane in blend.

That which is claimed is:

1. An oil and water repellent coating composition, comprising:
(a) a resin, selected from the group consisting of colloidal inorganic-based siloxane resin, poly(dialkylsiloxane)monoorgano substituted silsesquioxane block copolymer, acrylic polymer and copolymer, ethylene-vinyl acetate latex and styrene-butadiene latex,
(b) an aminoorganosilane of the general formula

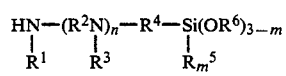

wherein $R^1$ is selected from the group consisting of hydrogen, alkyl of one to four carbon atoms or $$R^4Si(OR^6)_{3-m}$$
$$\quad |$$
$$R^5{}_m$$

$R^2$ is an alkylene group of two to four carbon atoms, $R^3$ is hydrogen or alkyl of one to four carbon atoms, $R^4$ is an alkylene group of three to four carbon atoms, $R^5$ and $R^6$ are alkyl groups of one to four carbon atoms each, n is zero to four and m is zero or one; and
(c) a perfluorinated organic compound of the general formula:

$$R_fY$$

wherein $R_f$ is a perfluoroalkyl group of four to 18 carbon atoms and Y is selected from the group consisting of —COOH, —COOR, wherein R is alkyl, alkoxyalkyl or hydroxyalkyl of one to eight carbon atoms;
wherein the combined amount of the aminoorganosilane and the perfluorinated organic compound comprises between about 0.1 and about 10 percent by weight of said resin and the molar ratio of the perfluorinated organic compound to the sum of primary and secondary amine group(s) in the aminoorganosilane is fixed between about 0.33 and about 1.0.

2. A composition in accordance with claim 1 wherein said aminoorganosilane is N-beta-aminoethyl-gamma-aminopropyltrimethoxysilane.

3. A composition in accordance with claim 2 wherein said perfluoroalkyl group, $R_f$, has six to twelve carbon atoms.

4. A composition in accordance with claim 3 wherein said perfluoroalkyl group, $R_f$ has seven to nine carbon atoms.

5. A composition in accordance with claim 1 wherein said perfluoroalkyl group, $R_f$, has seven to nine carbon atoms.

6. A composition in accordance with claim 4 wherein said resin is a colloidal inorganic-based siloxane resin.

7. A composition in accordance with claim 6 wherein said blend of perfluorinated organic compound and aminoorganosilane constitutes 1 to 3% by weight of said resin.

8. A composition in accordance with claim 4 wherein said resin is a block copolymer of poly(dimethylsiloxane) and phenylsilsesquioxane.

9. A composition in accordance with claim 8 wherein said resin is a block copolymer of about 70 mole percent poly(dimethylsiloxane) and about 30 mole percent phenylsilsesquioxane which has been capped with methyldimethoxysiloxy groups.

10. A composition in accordance with claim 9 wherein said blend of perfluorinated organic compound and aminoorganosilane constitute from 1% to 2% by weight of said resin solids.

11. A composition in accordance with claim 4 wherein, said resin is a thermosetting acrylic polymer or copolymer.

12. A composition in accordance with claim 4 wherein said resin is a thermoplastic acrylic polymer or copolymer.

13. A composition in accordance with claim 4 wherein said resin is a thermoplastic ethylene-vinyl acetate copolymer latex.

14. A composition in accordance with claim 4 wherein said resin is a thermoplastic styrene-butadiene copolymer latex.

15. The method of applying the composition of claim 1 to a solid or fabric substrate, whereby an oil and water repellent surface coating is provided to said substrate.

* * * * *